(12) United States Patent
Nilsson (10) Patent No.: US 9,677,488 B2
(45) Date of Patent: Jun. 13, 2017

(54) SELF-DIAGNOSING METHOD FOR DIAGNOSING A SCR SYSTEM

(75) Inventor: Henrik Nilsson, Mölndal (SE)

(73) Assignee: Volvo Lastvagnar AB, Göteborg (SE)

( * ) Notice: Subject to any disclaimer, the term of this patent is extended or adjusted under 35 U.S.C. 154(b) by 357 days.

(21) Appl. No.: 14/390,061

(22) PCT Filed: Apr. 10, 2012

(86) PCT No.: PCT/EP2012/001551
§ 371 (c)(1),
(2), (4) Date: Oct. 2, 2014

(87) PCT Pub. No.: WO2013/152780
PCT Pub. Date: Oct. 17, 2013

(65) Prior Publication Data
US 2015/0113953 A1  Apr. 30, 2015

(51) Int. Cl.
*F01N 3/00* (2006.01)
*F02D 41/02* (2006.01)
*F01N 3/20* (2006.01)
*F01N 11/00* (2006.01)

(52) U.S. Cl.
CPC ....... *F02D 41/0235* (2013.01); *F01N 3/2066* (2013.01); *F01N 11/00* (2013.01);
(Continued)

(58) Field of Classification Search
CPC ...... F01N 11/00; F01N 11/007; F01N 3/2066; F01N 2430/08; F01N 2550/02;
(Continued)

(56) References Cited

U.S. PATENT DOCUMENTS

| 7,854,161 B2 | 12/2010 | Hjorsberg et al. |
| 2001/0054282 A1* | 12/2001 | Lang ............... B01D 53/9495 60/277 |

(Continued)

FOREIGN PATENT DOCUMENTS

| DE | 10326932 A1 * | 1/2005 | ........... F01N 3/0842 |
| EP | 2128396 A1 | 12/2009 | |

(Continued)

OTHER PUBLICATIONS

Chinese Official Action (Mar. 25, 2016) for corresponding Chinese App. 201280072295.2.

(Continued)

*Primary Examiner* — Jason Shanske
*Assistant Examiner* — Matthew T Largi
(74) *Attorney, Agent, or Firm* — WRB-IP LLP (57) ABSTRACT

A self-diagnosing method for diagnosing a selective catalytic reduction (SCR) system of a vehicle that includes an internal combustion engine. An SCR system is arranged downstream of the engine, and the SCR system includes at least one exhaust gas sensor that is sensitive to nitrogen oxides (NOx) gas. The method includes a first diagnosing sequence (S1) of ensuring that the vehicle is in a stationary state, controlling the engine to operate in a high NOx output engine operating state and in a low NOx output engine operating state, registering an output signal of the at least one exhaust gas sensor when the engine operates in each of the high NOx output engine operating state and low NOx output engine operating state, and diagnosing NOx measurement performance of the at least one exhaust gas sensor on the basis of the registered sensor output.

16 Claims, 3 Drawing Sheets

(52) U.S. Cl.
CPC ........ *F01N 11/007* (2013.01); *F01N 2430/08* (2013.01); *F01N 2550/02* (2013.01); *F01N 2560/00* (2013.01); *F01N 2560/026* (2013.01); *F01N 2900/04* (2013.01); *F01N 2900/1402* (2013.01); *F01N 2900/1622* (2013.01); *Y02T 10/24* (2013.01); *Y02T 10/47* (2013.01)

(58) Field of Classification Search
CPC ........... F01N 2560/00; F01N 2560/026; F01N 2900/04; F01N 2900/1402; F01N 2900/1622; F02D 41/0235
See application file for complete search history.

(56) References Cited

U.S. PATENT DOCUMENTS

| | | | |
|---|---|---|---|
| 2010/0205938 A1* | 8/2010 | Ding | F02D 41/064 60/276 |
| 2010/0218487 A1 | 9/2010 | Wang et al. | |
| 2010/0223908 A1* | 9/2010 | Solbrig | B01D 53/90 60/276 |
| 2011/0023459 A1* | 2/2011 | Nieuwstadt | F02D 41/064 60/285 |
| 2011/0061372 A1 | 3/2011 | Levijoki et al. | |

FOREIGN PATENT DOCUMENTS

| | | | |
|---|---|---|---|
| EP | 2128398 A1 | 12/2009 | |
| SE | WO 2008094116 A1 * | 8/2008 | ........... F01N 3/2006 |
| WO | 2008094116 A1 | 8/2008 | |
| WO | 2009022217 A1 | 2/2009 | |
| WO | 2010068147 A1 | 6/2010 | |

OTHER PUBLICATIONS

International Search Report (Jan. 11, 2013) for corresponding International Application PCT/EP2012/001551.

* cited by examiner

SELF-DIAGNOSING METHOD FOR DIAGNOSING A SCR SYSTEM

BACKGROUND AND SUMMARY

This invention relates to a self-diagnosing method for diagnosing a selective catalytic reduction (SCR) system of a vehicle, which comprises an internal combustion engine, wherein said SCR system is arranged downstream of the engine, wherein the SCR system comprises at least one exhaust gas sensor being sensitive to nitrogen oxides (NOx) gas.

The invention also relates to a computer program comprising program code means for performing the inventive method, a computer program product comprising program code means stored on a computer readable medium for performing the inventive method, and a computer system for implementing, the inventive method.

The method of the invention is particularly applicable for diagnosing a SCR system of large compression ignition engine that is configured to be powered with diesel or similar fuel types. Such an engine is frequently used in for example heavy duty trucks, buses, wheel loaders, articulated haulers, marine applications, or the like. The invention is however useful also for vehicles in the medium and light duty segments.

Present regulatory conditions in the automotive market have led to an increasing demand to improve fuel economy and reduce emissions in present vehicles. These regulatory conditions must be balanced with the demands of a consumer for high performance and quick response for a vehicle.

A diesel engine has a high efficiency of and is one of the best converters of fossil energy. NOx emission concentration is dependent upon local oxygen atom concentration and the local temperature. Said high efficiency is however only possible at an elevated combustion temperature at which high NOx levels are inevitable. Moreover, a suppression of NOx formation by internal means (airfuel ratio) has the tendency to cause an increase in particulates, known as the NOx-particulates trade off.

Reducing the oxides of nitrogen (NO and NO2, referred to as NOx) and particulate matter (PM) in exhaust gases from a diesel engine has become a very important problem in view of the protection of environment and the saving of finite fossil energy supply.

Vehicles equipped with diesel or other lean burn engines offer the benefit of increased fuel economy, however, catalytic reduction of NOx emissions via conventional means in such systems is difficult due to the high content of oxygen in the exhaust gas. In this regard Selective Catalytic Reduction (SCR) catalysts, in which NOx is continuously removed through active injection of a reductant into the exhaust gas mixture entering the catalyst are known to achieve high NOx conversion efficiency. Urea based SCR catalysts use gaseous ammonia as the active NOx reducing reductant. Typically, an aqueous solution of urea is carried on board of a vehicle, and an injection system is used to supply it into the exhaust gas stream entering the SCR catalyst where it decomposes into hydro cyanic acid (NHCO) and gaseous ammonia (NH3), which is then used to convert NOx.

However, in such systems, urea injection levels have to be very precisely controlled. Under-injection of urea may result in sub-optimal NOx conversion, while over-injection may cause tailpipe ammonia slip. In a typical urea-based SCR catalyst system, the amount of urea injected is in proportion to the exhaust gas NOx concentration that represents a trade-off between maximum NOX conversion and minimum ammonia slip.

The NOx conversion efficiency of a SCR system can normally be continuously derived during operation of the vehicle, for example by means of at least one NOx sensor arranged downstream of a SCR catalyst. The engine management system may set different diagnostic troubles codes if registered values are outside predetermined ranges, such as low NOx reduction level in SCR catalyst, NOx sensor error indication, low exhaust gas heating performance, high engine NOx output level, or the like. When a vehicle with one or more of such general diagnostic trouble codes is repaired, it may be difficult to exactly determine the root cause behind the trouble code or irrational NOx values, because there are many different alternative causes that may result in the same diagnose.

Furthermore, after replacing parts of the SCR system, the testing and verification procedure of the correct function of the SCR system is time consuming, and unreliable. Document US2011061372A for example shows an on board exhaust diagnostic system including a SCR efficiency testing sequence that is performed during driving of the vehicle. For this reason, the testing and verification procedure is sometimes completely omitted, thereby risking delivery of a repaired vehicle that does not operate correctly.

There is thus a need for an improved method for diagnosing a SCR system removing the above mentioned disadvantages.

It is desirable to provide an inventive self-diagnosing method for diagnosing a SCR system of a vehicle, where the previously mentioned problem is at least partly avoided.

The vehicle according to the inventive method comprises an internal combustion engine and the SCR system is arranged downstream of the engine. The SCR system comprises at least one exhaust gas sensor being sensitive to nitrogen oxides (NOx) gas. The method comprises a first diagnosing sequence of:

ensuring that said vehicle is in a stationary state;
controlling said engine to operate in a high NOx output engine operating state and in a low NOx output engine operating state;
registering an output signal of said at least one exhaust gas sensor when the engine operates in each of said high NOx output engine operating state and low NOx output engine operating state; and
diagnosing NOx measurement performance of said at least one exhaust gas sensor on the basis of said registered sensor output.

The inventive method is a self-diagnosing method comprising at least one predefined test sequence. There is thus no need for a technician himself to develop and realise any test sequences of the engine and/or SCR system, and to draw any potentially erroneous subjective conclusions therefrom. The inventive method also reduces the likelihood that untested repaired vehicles are being delivered back to the customer, thereby reducing the risk of return repairs and customer dissatisfaction. Instead a predetermined self-diagnosing method is automatically conducted upon command of the technician. The self-diagnosing method further includes predetermined threshold values for evaluating the performance of the SCR system, such as for example the performance of one or more exhaust gas sensors. A predetermined threshold value may herein be represented by a predetermined quantified value, or calculated using predetermined mathematical functions. This procedure makes the diagnosing result much more objective, reliable, and less time consuming. The at least one test sequence of the self-diagnosing method may be determined by engineers that are experts in SCR systems and exhaust gas aftertreatment systems, such that the result of the test can deliver an accurate and representative diagnose of the SCR system.

According to a preferred embodiment, the engine is controlled to operate alternating in a high NOx output engine operating state and in a low NOx output engine operating state. This alternating operation, which includes at least one transition between a high NOx output engine operating state and a low NOx output engine operating state, allows evaluation and diagnose of the NOx measurement performance of the exhaust gas sensor based on registered sensor output. The measurement performance is here evaluated in terms of the exhaust gas sensor's capability of accurately measuring high and low NOx levels. If for example the engine operates in a high NOx state and subsequently in a low NOx state, the difference in measured NOx level as provided by the exhaust gas sensor can be compared with a predetermined value, and based on this comparison a conclusion can be derived concerning the function of the exhaust gas sensor.

The fact that the vehicle is in a stationary state when the method is performed makes the test less time consuming and more accurate. There is also no longer a need to drive a fully loaded vehicle during the test, and the risk that the driver and diagnosing system do not operate consistently resulting in reduced quality and reliability of the diagnose result, is eliminated. Required exhaust gas temperature may be accomplished by means of applying vehicle internal engine loads, such as exhaust gas braking, aftertreatment hydrocarbon injection, high engine speed, or the like.

Further advantages are achieved by implementing one or several of the features of the dependent claims.

The first diagnosing sequence may further comprise controlling said engine to perform at least one transition from said high NOx output engine operating state to said low NOx output engine operating state, and from said low NOx output engine operating state to said high NOx output engine operating state, as well as registering said output signal from said at least one exhaust gas sensor at least before and after each of said transitions. By including at least two transitions, one from a high NOx state to a low NOx state, and oppositely, further conclusions can be derived about the functioning and quality of the exhaust gas sensor, thereby delivering an improved diagnosis.

The method may further comprise a second diagnosing sequence of:
  increasing engine speed to a high level engine speed;
  cutting fuel supply to said engine at said high level engine speed and registering said output signal from said at least one exhaust gas sensor at least a certain a time period after fuel supply cut; and
  diagnosing NOx measurement performance of said at least one exhaust gas sensor on the basis of said registered sensor output.

The second diagnosing sequence uses the moment of inertia of the engine that is available at a high engine speed to pump in air into the exhaust system by means of the combustion pistons. The pumped in air results in a very low NOx level within the exhaust system at the location of the exhaust gas sensor, thereby facilitating diagnosing of very low NOx emission level measurement performance by the exhaust gas sensor.

The first diagnosing sequence may preferably be performed before said second diagnosing sequence. This order of testing, where the fuel injection is cut such that the engine will automatically stop at the end of the second diagnosing sequence, has the advantage of allowing a natural and efficient termination of the self-diagnosing method.

The SCR system may comprise a SCR catalyst and a reductant injector, wherein said at least one exhaust gas sensor may be arranged downstream said SCR catalyst. The method may further comprise a third diagnosing sequence of:
  controlling said reductant injector to perform in a non-reductant injection state and in a reductant injection state;
  registering an output signal from said at least one exhaust gas sensor when said reductant injector performs in each of said non-reductant injection state and said reductant injection state; and
  diagnosing NOx conversion efficiency of said SCR catalyst on the basis of said registered sensor output.

By controlling the reductant injector to alternative at least once between a non-reductant injection state and in a reductant injection state, the NOx conversion efficiency of the SCR catalyst can be accurately diagnosed on the basis of the registered sensor output. If for example the reductant injector operates in a non-reductant injection state, and subsequently starts injecting reductant according to a injection model or the like, such that the reductant injector starts operating in a reductant injection state, the difference in measured NOx level by means of the exhaust gas sensor can be compared with a value provided by the diagnosing method, and based on this comparison a conclusion can be derived concerning the function and NOx conversion efficiency of the SCR catalyst.

The third diagnosing sequence may comprise repeating at least one shift between said non-reductant injection state and said reductant injection state, and registering said output signal from said at least one exhaust gas sensor at least before and after each of said repeated shifts. Repeated shifts may result in a more accurate diagnosis of the SCR conversion efficiency.

The first diagnosing sequence may advantageously be performed before said third diagnosing sequence, because this allows the self-diagnosing method to eliminate any erroneously determined NOx conversion efficiency due to erroneous exhaust gas sensor measurements. Consequently, in case the NOx conversion efficiency does not reach an expected level, the cause can be narrowed down to malfunctioning SCR catalyst, reductant injector failure, or bad reductant quality, or the like. The inventive method is consequently able to differ between exhaust gas sensor failure and SCR conversion failure.

The third diagnosing sequence may preferably be performed before said second diagnosing sequence. This order of testing, where the fuel injection is cut such that the engine will automatically stop at the end of the second diagnosing sequence, has the advantage of allowing a natural and efficient termination of the self-diagnosing method.

The exhaust gas sensor may preferably be sensitive also to oxygen, such that the exhaust gas sensor is capable of measuring the oxygen concentration of the exhaust gas for determining a lambda ($\lambda$) value of the air/fuel mixture entering the cylinders, wherein said method further comprising diagnosing oxygen measurement performance of the exhaust gas sensor on the basis of said registered sensor output. Diagnosis of both NOx detection performance and oxygen detection performance can thus be realised simultaneously, thereby facilitating an efficient self-diagnosing method. Oxygen measurement performance is very important for operating the engine with the correct air/fuel ratio, such that low NOx emission levels are generated.

The SCR system may further comprise a SCR catalyst and at least two exhaust gas sensors, wherein a first exhaust gas sensor of said at least two exhaust gas sensors is arranged downstream of said SCR catalyst, and a second exhaust gas sensor of said at least two exhaust gas sensors is arranged upstream of said SCR catalyst, wherein both said first and second exhaust gas sensors being sensitive to NOx gas. The first diagnosing sequence would then comprise the steps of:
   registering an output signal of each of said first and second exhaust gas sensors when the engine performs in each of said high NOx output engine operating state and low NOx output engine operating state; and
      diagnosing NOx measurement performance of said first and second exhaust gas sensors on the basis of said registered sensor output. By means of the two exhaust gas sensors, one positioned on each side of the SCR catalyst, a very accurate measurement of the NOx emission level entering and leaving the SCR catalyst may be determined, thereby facilitating an accurate diagnose of the SCR NOx conversion efficiency. Without a gas exhaust sensor upstream the SCR catalyst, the NOx emission level entering the SCR catalyst must be estimated, thereby reducing the reliability and accuracy of the self-diagnosing method.

The method may include an initial step of controlling that an exhaust gas temperature of said SCR system exceeds a predetermined temperature level. Thereby any fluctuations in engine NOx emission values, and/or exhaust gas sensor measurement performance, and/or SCR conversion efficiency can be eliminated. Furthermore, the NOx catalyst requires that the temperature is above about 200° C. to fully operate in the third test sequence.

The SCR system may comprise a SCR catalyst and a reductant injector, wherein said at least one exhaust gas sensor is arranged downstream said SCR catalyst, wherein the method includes an initial step of controlling that that said reductant injection is stopped, and that a SCR catalyst ammonia storage level is substantially below the current maximal ammonia storage capacity of said SCR catalyst. It is advantageous, especially before entering the third test sequence, to empty the ammonia buffer of the SCR catalyst, because otherwise the stored ammonia in the SCR catalyst will uphold a relatively high NOx conversion efficiency also after stopping the reductant injection, thereby potentially leading to incorrect assumptions with respect to NOx conversion efficiency of the SCR system, and/or the reductant injection system, and/or the engine NOx emission level.

The method may comprise the initial step of activating said at least one exhaust gas sensor first after an exhaust gas temperature associated with said at least one exhaust gas sensor exceeds a predetermined temperature level. Avoiding manual activation of the sensor eliminates the risk that the sensor is activated at a too low temperature, which activation could potentially damage the sensor.

A computer program may also be provided, which program comprising program code means for performing all the steps of at least claim 1 when said program is run on a computer.

A computer program product may also be provided, which product comprising program code means stored on a computer readable medium for performing all the steps of at least claim 1 when said program product is run on a computer.

A computer system for implementing a method for diagnosing a selective catalytic reduction (SCR) system of a vehicle may also be provided. The vehicle comprises an internal combustion engine, wherein said SCR system is arranged downstream of the engine, wherein the SCR system comprises at least one exhaust gas sensor being sensitive to nitrogen oxides (NOx) gas, the computer system comprising a processor operable to:
   ensuring that said vehicle is in a stationary state;
   controlling said engine to operate in a high NOx output engine operating state and in a low NOx output engine operating state;
   registering an output signal of said at least one exhaust gas sensor when the engine operates in each of said high NOx output engine operating state and low NOx output engine operating state; and
   diagnosing NOx measurement performance of said at least one exhaust gas sensor on the basis of said registered sensor output.

BRIEF DESCRIPTION OF DRAWINGS

In the detailed description of the invention given below reference is made to the following figure, in which.

DETAILED DESCRIPTION

Various aspects of the invention will hereinafter be described in conjunction with the appended drawings to illustrate and not to limit the invention, wherein like designations denote like elements, and variations of the inventive aspects are not restricted to the specifically shown embodiments, but are applicable on other variations of the invention.

Figure 1:
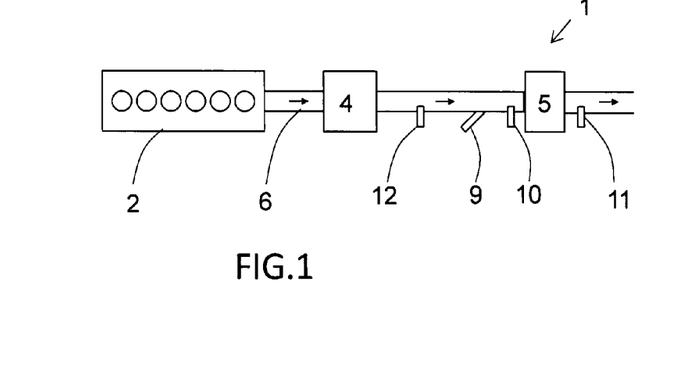
FIG. 1 shows a simplified layout of a exhaust aftertreatment system.

FIG. 1 shows schematically an exemplary layout of an exhaust aftertreatment system 1 of a diesel engine 2, in particular for a heavy truck or bus, or the like. The specific exhaust aftertreatment system 1 shown includes a particulate filter 4 to reduce the level of particulate matter. NOx emission from the engine 2 must also be reduced to comply with regulatory emission standards, and a SCR catalyst 5 is installed along the exhaust gas pipe 6 for this reason. Selective catalytic reduction is a means of converting NOx with the aid of a catalyst into nitrogen (N2) and water (H2O). A reductant, typically urea, is added to the exhaust gas stream upstream of the SCR catalyst 5 by means of a reductant injector 9, and converted to ammonia upon hydrolysis, which ammonia may be adsorbed onto the SCR catalyst 5. The SCR catalyst 5 may be of the iron- or copper-based zeolite type, or vanadium-based type. Control of reductant injection rate at the injector 9 may be based on a reductant dosing model, which may use different parameters as input signals, such as temperature of the exhaust gas entering the SCR catalyst 5 as provided by a temperature sensor 10. A first exhaust gas sensor 11 located downstream of the SCR catalyst 5, and a second exhaust gas sensor 12 is installed upstream of the SCR catalyst 5, such that SCR NOx conversion efficiency can be accurately determined. In case the second exhaust gas sensor 12 is not available, the NOx level upstream of the SCR catalyst 5 may be estimated based on engine and/or exhaust aftertreatment characteristics, such as engine and fuel injection settings, engine load, engine speed, etc.

The SCR conversion efficiency can for example be determined as an isolated part, without influence of other possibly influential factors. The SCR conversion efficiency (ηSCR) may then be calculated by the following equation:

$$\eta SCR = (Qupstream\_nox - Qdownstream\_nox)/Qupstream\_nox.$$

Alternatively, the SCR conversion efficiency can be determined taking into account other externally influential factors, such as for example the reductant injection level. Taking into account the reductant injection level when determining the SCR conversion efficiency has the advantage of providing an efficient tool for exit an inducement. The inducement, which may take to form of reduced maximal allowed speed or engine torque reduction, normally occurs due to excessive NOx emissions. In case the excessive NOx emissions was as result of driver tampering with the SCR system, such as dilution of the reductant agent by water, or the like, then the self test according to the invention can result in an exit from the inducement by verification that the SCR conversion efficiency taking into account reductant injection level is above a legally set limit. The SCR conversion efficiency taking into account the reductant injection level (ηSCR-reductant), also referred to as reductant efficiency may be calculated by the following equation:

$$\eta SCR\text{-}reductant = (Qupstream\_nox - Qdownstream\_nox)/(Qreductant/KNOxToReductant). \text{ Where,}$$

Qupstream_nox denotes NOx level flow at the SCR inlet in gram/second,

Qdownstream_nox denotes NOx level flow at the SCR outlet in gram/second, Qreductant denotes reductant flow in gram/second, and KNOxToReductant denotes a quantified physical maximum NOx conversion for predetermined reductant level, and may be provided by engine control functions. Q denotes flow in gram/second.

During service and repair of vehicle SCR systems, a technician at the service shop may find active and inactive error messages or diagnostic trouble codes from the engine management system, whereby theses error messages may indicate different types of errors in the SCR system, such as poor NOx conversion, etc. Currently, it is very time consuming and difficult for a technician at the service shop to find root causes for said error messages, and the NOx values from the NOx sensors may appear irrational. In addition, verification after repair normally requires a test drive with fully loaded vehicle to verify correct operation during high temperature operation. Due to time constraints, such verification often left for the costumer to do, thereby increasing the risk of return repairs and customer frustration.

The method according to the invention solves this problem by providing an automatic NOx sensor test and SCR conversion test. The self-diagnosing method takes control of demanded engine out NOx, engine aftertreatment heating, engine speed and urea dosing in one or more different diagnosing sequences S1, S2, S3 that provides a diagnostic self test result on the functionality of the SCR system. The method is configured to evaluate, by means of a number of predefined steps, at least the NOx sensors' capability of, and accuracy in, reading high and low NOx levels. Optionally, the method may be configured to also evaluate that sufficiently high SCR conversion efficiency is achieved by the SCR system while dosing reductant, such as urea. The self-diagnosing method is also configured to continuously and in a pedagogical manner present the procedure, system status, cause and effects, and test results to the repair technicians by means of an external display tool in real time throughout the entire self-diagnosing method.

The method according to the invention enables efficient, fast and accurate fault tracing of the NOx sensors, verification of NOx sensors and SCR conversion functionality on a parked vehicle, for example after replacement of SCR system components. There is no longer a need to test drive with a fully loaded vehicle, and the verification can be performed before returning the vehicle to the customer, such that the risk of return repairs is reduced. Moreover, the method according to the invention enables education of technicians and users of the fundamental functioning of the SCR system and NOx sensors' by means of the display tool. Finally, the method according to the invention provides an efficient tool for exciting an inducement caused by improper handling of the SCR system.

Figure 2:
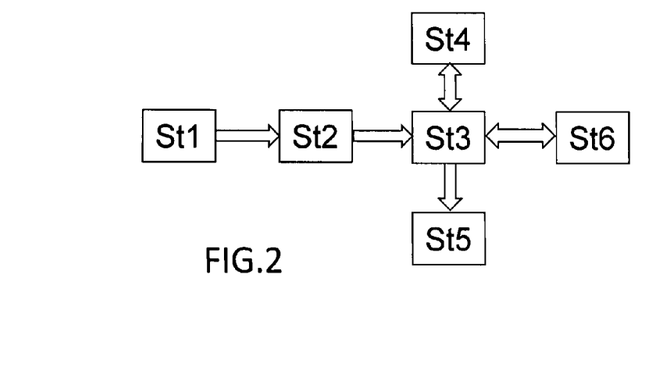
FIG. 2 shows different states of the method, and their internal relationship.
Figure 3:
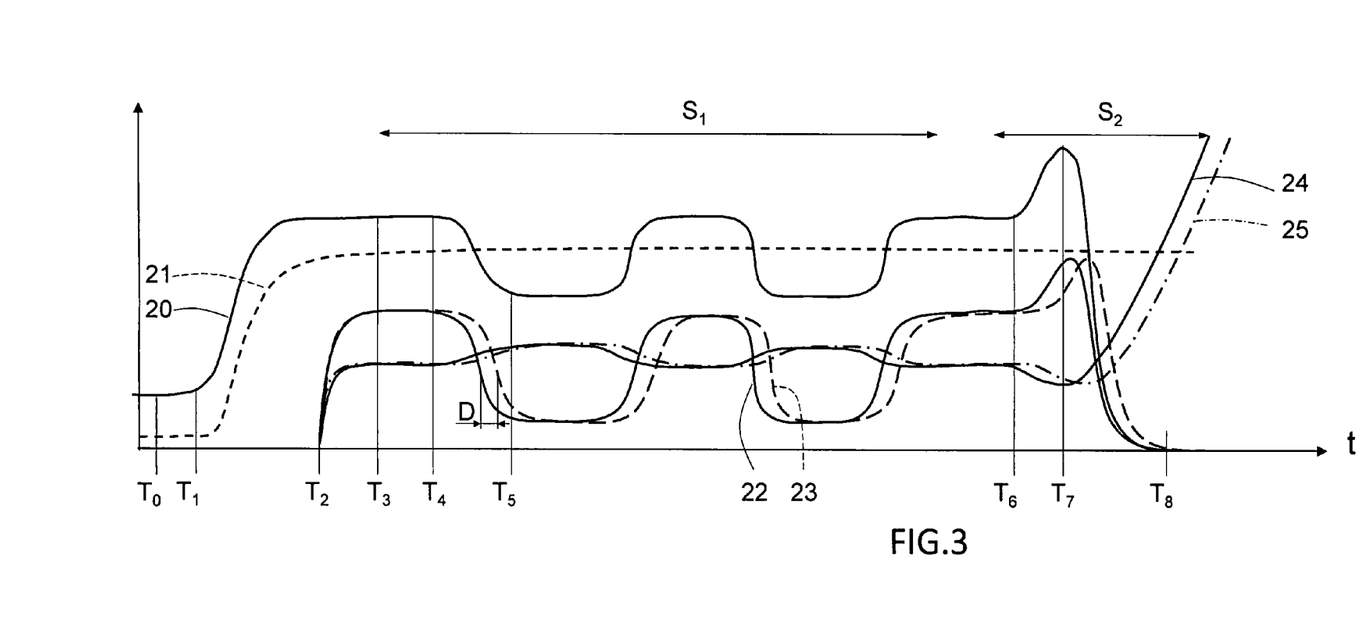
FIG. 3 shows a time diagram with continuous parameter values of selected engine and SCR system characteristics.
Figure 4:
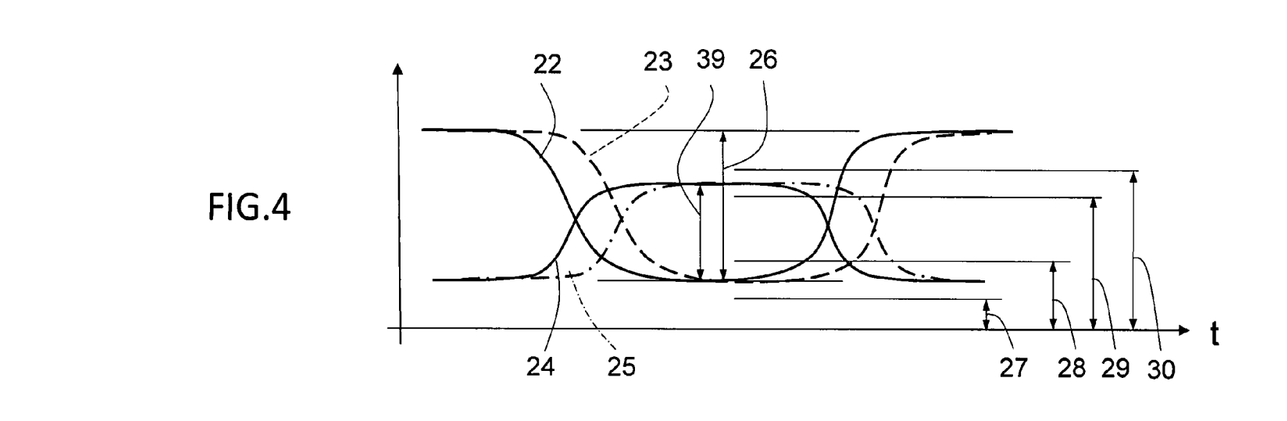
FIG. 4 shows part of the diagram of FIG. 3 in more detail.
Figure 5:
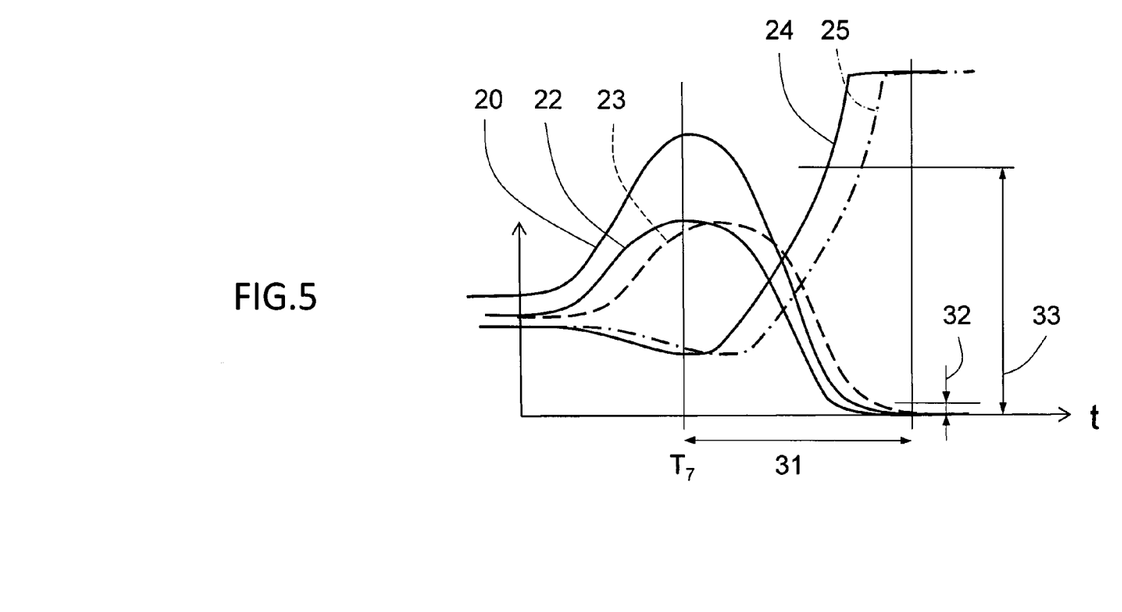
FIG. 5 shows part of the diagram of FIG. 3 in more detail.

The different states of the self-diagnosing method are schematically illustrated in FIG. 2, and a first embodiment of the method according to the invention will hereinafter be disclosed in connection with FIG. 3, FIG. 4 and FIG. 5. At the begin of the self-test, at time T0, the self-diagnosing method is in a first state St1 that includes checking that a number of predefined enablement conditions are fulfilled, such as applied parking brake, engine started, gear in neutral, sufficient reductant fill level, etc. When all predefined enablement conditions are fulfilled, the self-diagnosing method enters a second state St2 that includes heating of the SCR system. Heating may for example by performed by engine aftertreatment heating, i.e. injecting unburnt hydrocarbon into the exhaust gas upstream the particulate filter 4, applying engine loads, such as engine brakes, increasing engine speed 20 to above about 1200 rpm, or the like. As a result, SCR system temperature 21 increases rapidly, as illustrated in FIG. 3. The heating phase is preferably continued until a SCR catalyst ammonia storage level is substantially below the current maximal ammonia storage capacity of said SCR catalyst 5, and ammonia storage level estimation models are normally available for this purpose. Clearly, the reductant injection is preferably completely stopped during the heating phase to faster attain an empty SCR catalyst buffer. The exhaust gas sensors 11, 12 are activated by the method first after the exhaust gas temperature associated with said the exhaust gas sensors 11, 12 has exceeded a predetermined temperature level in order to avoid any risk of sensor damages due to activation at low temperature. When the exhaust gas temperature of said SCR system as for example measured by the temperature sensor 10 exceeds a predetermined temperature level, such as about 400° C., the self-diagnosing method enters a third state St3.

The third state St3 is characterised by operating the engine 2 in a high NOx output engine operating state. There is also no reductant injection in the third state St3. The high engine NOx output level may for example be attained by suitable setting of the fuel injection timing, a high engine speed, and optionally applied engine loads.

The self-diagnosing method according to the invention is herein after described comprising three different diagnosing sequences S1, S2, S3. The first diagnosing sequence S1, which includes engine operation in the third state St3 and in a fourth state St4. The fourth state St4 is characterised by a low NOx output engine operating state, and no reductant injection. The engine is controlled to operate alternating in the third state St3, i.e. in a high NOx output engine operating state, and in the fourth state St4, i.e. in an low NOx output engine operating state. The engine is controlled to switch between these states St3, St4 at least once, and an output signal of the exhaust gas sensors 11, 12 are registered when the engine 2 operates in the high NOx output engine operating state and the low NOx output engine operating state.

Time T1 in FIG. 3 denotes a time when all predefined enablement conditions are fulfilled and the self-diagnosing method enters the second state St2. At time T2 the exhaust gas sensors are activated upon reaching a predetermined temperature level. The self-diagnosing method then enters the third state St3 at time T3 involving operation in the high NOx output engine operating state, and switches to the fourth state involving operation in the low NOx output engine operating state at time T. As clearly disclosed in FIG. 3 the NOx level output signals 22, 23 of the first and second exhaust gas sensors 11, 12 will decrease upon entering the fourth state St4, whereby the NOx level output signal 22 of the second exhaust gas sensors 12 arranged upstream the SCR catalyst 5 will decrease due to the reduction in NOx emission a certain time before the NOx level output signal 23 of the first exhaust gas sensor 11 that is arranged downstream the SCR catalyst 5, thereby explaining the delay D. At time TS, the engine speed 20 has stabilised at the new lower level and the NOx level output signals 22, 23 of the first and second exhaust gas sensors 11, 12 converge as a sign of a stable exhaust gas conditions.

The exhaust gas sensors 11, 12 are preferably of the type capable of also measuring oxygen gas concentration in the exhaust gas. The measured oxygen level output signals 24, 25 of the exhaust gas sensors 11, 12 are included in FIG. 3. Knowledge of the oxygen concentration in the exhaust gas allows the engine management system to better control the air/fuel mix because the oxygen concentration is an indication of the lambda ($\lambda$) value of the air/fuel mixture entering the cylinders.

As illustrated in FIG. 3 the oxygen concentration in the exhaust gas increases upon entering the fourth state St4 from the third state St3. A shift from the third state St3 to the fourth state St4, and then back to the third state St3 is shown more in detail in FIG. 4, in which the measured NOx level output signals 22, 23 and oxygen level output signals 24, 25 of the exhaust gas sensors 11, 12 are illustrated, including their internal delay D upon transient engine conditions. For diagnosing the NOx measurement performance of the exhaust gas sensors 11, 12, the NOx level output signals 22, 23 of the exhaust gas sensors 11, 12 are registered both when the engine 2 operates in the high NOx output engine operating state and in the low NOx output engine operating state, and then a NOx level output signal difference 26 is calculated and compared with a predefined threshold value. Moreover, it is verified that the NOx level output signals 22, 23 at stabilised exhaust gas condition lays within a window defined by a lower and upper threshold value 27, 28. Similarly, for diagnosing the oxygen concentration measurement performance of the exhaust gas sensors 11, 12, the oxygen concentration output signals 24, 25 of the exhaust gas sensors 11, 12 are registered both when the engine 2 operates in the high NOx output engine operating state and in the low NOx output engine operating state, and then a oxygen concentration level output signal difference 39 is calculated and compared with a predefined threshold value. It is also verified that the oxygen level output signals 24, 25 at stabilised exhaust gas condition lay within a window defined by a lower and upper threshold value 29, 30. Similar diagnose of the NOx level output signals 22, 23 and oxygen level output signals 24, 25 is performed upon returning the third state St3. The shift between the third and fourth state St3, St4 may then be repeated a predetermined number of times for increased robustness in terms of the diagnose result. In FIG. 3, four shifts are illustrated.

In the first embodiment of the method according to the invention, the first diagnosing sequence Si is followed by a second diagnosing sequence S2 that ends the self-diagnosing method. This corresponds to shifting from the third state St3 to a fifth state St5. In the second diagnosing sequence S2, which includes the fifth state St5, the engine speed is controlled to increase to a high level engine speed. Thereafter, fuel supply to the engine 2 is cut and the output signals from exhaust gas sensors 11, 12 are registered at least after a certain delay 31. The moment of inertia of the engine at the high engine speed will pump air into the exhaust system by means of the combustion pistons upon cutting the fuel supply. The pumped in air results in a very low NOx level and very high oxygen concentration level within the exhaust system at the location of the exhaust gas sensors 11, 12, thereby facilitating diagnosing of very low NOx emission level measurement performance, and very high oxygen concentration level measurement performance, by the exhaust gas sensors. In FIG. 3, engine speed is controlled to increase at time 'Y$\beta$, and fuel is cut at time T7, after which the engine slows down due to internal friction until the engine come to halt at time Te, thereby ending the self-diagnosing method. The NOx level output signals 22, 23 decreases to nil upon stopping the engine, and the oxygen level output signals 24, 25 simultaneously increases towards maximal output values.

The second diagnosing sequence S2 aims primarily for diagnosing the exhaust gas sensors 11, 12 capability to measure a very low NOx emission level and a very high oxygen concentration level. For example, as illustrated in FIG. 5, the NOx level output signals 22, 23 and oxygen level output signals 24, 25 may be registered a certain a time period 31 after time point T7 of fuel supply cut, and it may be verified that both NOx level output signals 22, 23 are smaller than a threshold value 32, and that both oxygen concentration level output signals 24, 25 are higher than a threshold value 33. In FIG. 5, the oxygen concentration level output signals 24, 25 at time of verification have reached a maximal value. The NOx measurement performance and oxygen concentration measurement performance of the exhaust gas sensors 11, 12 are subsequently diagnosed based on the registered sensor output.

The first diagnosing sequence Si is preferably performed before the second diagnosing sequence S2. This order of testing, where the fuel injection is cut such that the engine will automatically stop at the end of the second diagnosing sequence, has the advantage of allowing a natural and efficient termination of the self-diagnosing method.

Figure 6:
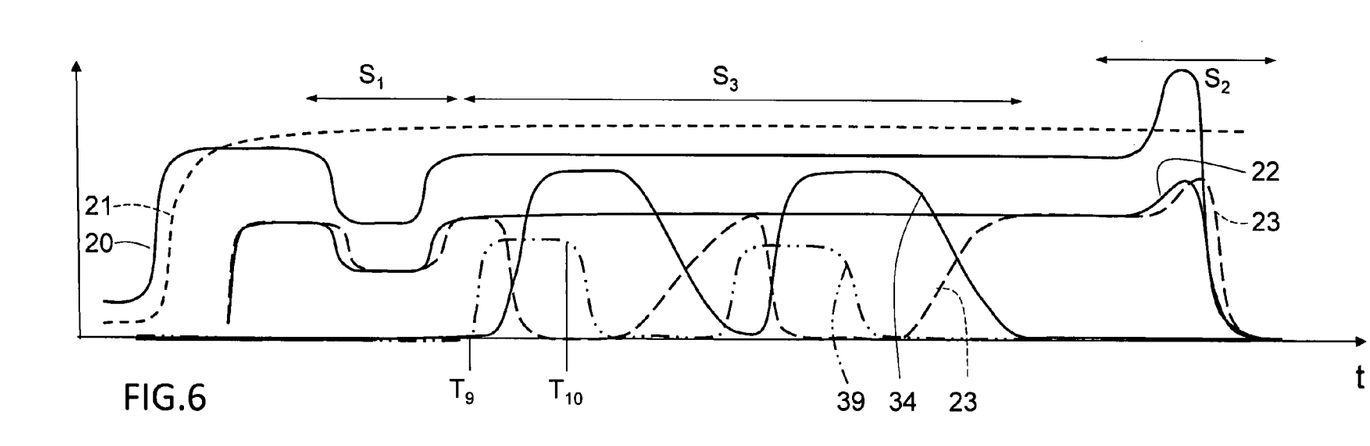
FIG. 6 shows a time diagram with continuous parameter values of selected engine and SCR system characteristics.

A second embodiment of the method according to the invention will hereinafter be disclosed in connection with FIG. 2, FIG. 6 and FIG. 7. Here, a SCR NOx conversion efficiency test is included into the self-diagnosing method in addition to the exhaust gas sensor test of to the first embodiment. According to the second embodiment, the self-diagnosing method executes the first and second states St1, St2, as in the first embodiment. Thereafter the self-test enters the first diagnosing sequence S1, which here includes operation in the third and fourth state St3, St4. Thereafter, at time T9, the self-test initiates a third diagnosing sequence S3 that includes operation in a sixth state St6. The sixth state St6 is characterised by maintained engine operation in the high NOx output engine operating state, and maintained high SCR system temperature, but in addition starting injection of reductant. The reductant injection upstream the SCR catalyst 5 will result in significantly reduced NOx emission level downstream the SCR catalyst 5, and the NOx level output signals from the first and second exhaust gas sensors 11, 12 will consequently start to diverge. A NOx conversion efficiency 34 may be calculated, based on the diverging NOx level output signals 22, 23, and possibly also the current reductant injection level. After registering the NOx level output signals 22, 23, both before initiating reductant injection and during reductant injection with stabilised exhaust gas conditions, and subsequent verification of the output signal 23 of the first exhaust gas sensor 11, as well as the calculated NOx conversion efficiency 34, the self-test returns to the third state St3 at time T10. The shift between the third and sixth state St3, St6 may then be repeated a predetermined number of times for increased robustness in terms of the diagnose result. In FIG. 6, four shifts are illustrated.

Figure 7:
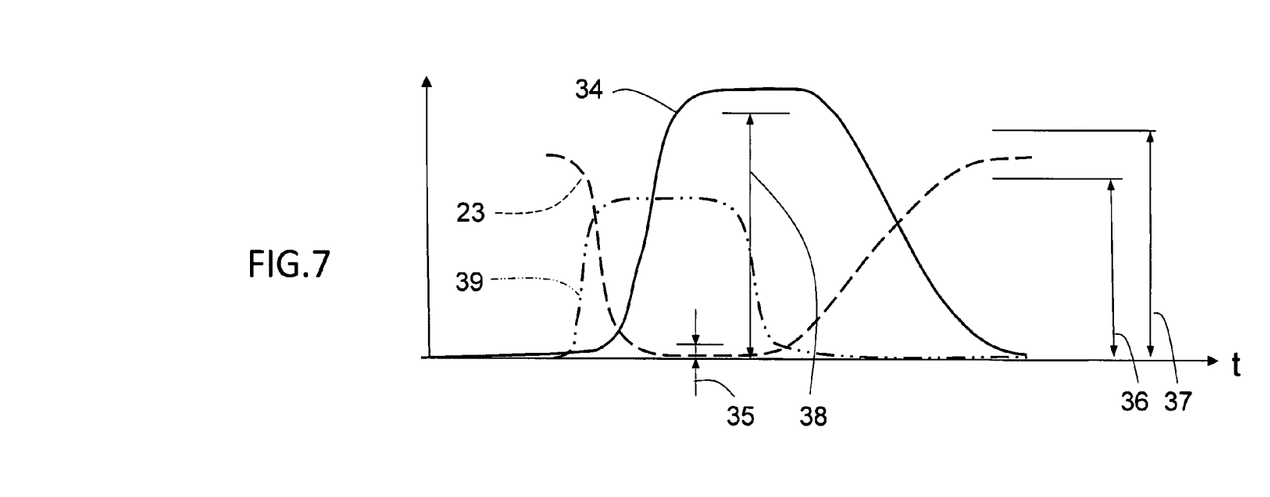
FIG. 7 shows part of the diagram of FIG. 6 in more detail.

A shift from the third state St3 to the sixth state St6, and then back to the third state St3 is shown more in detail in FIG. 7, in which the measured NOx level output signal 22 of the first exhaust gas sensors 11, the reductant injection level 39, and NOx conversion efficiency 34 are illustrated. For diagnosing the NOx conversion efficiency performance of the SCR system, the NOx level output signals 22, 23 of the first and second exhaust gas sensors 11, 12 are registered both in a reductant injection state and in a non-reductant injection state. Clearly, the NOx level output signal 22 of the second exhaust gas sensor 12 is not influenced by the reductant injection since the second exhaust gas sensor 12 is positioned upstream of both the SCR catalyst 5 and the reductant injector 9. Furthermore, a NOx conversion efficiency 34 is calculated based on the measured difference in NOx level output signals 22, 23 of the first and second exhaust gas sensors 11, 12. Alternatively, as mentioned above, the SCR conversion efficiency 34 can be determined taking into account also the reductant injection level, such that a combined SCR conversion efficiency 34 can be calculated that takes into account upstream NOx level, downstream NOx level, and reductant injection level.

The NOx level output signal 23 of the first exhaust gas sensor 11 is registered at stabilised exhaust gas condition during injection, and it is verified that the registered NOx level output signal 23 lays below a predefined threshold value 35. Similarly, it is verified that the calculated NOx conversion efficiency 34 at stabilised exhaust gas conditions during injection is above a predetermined threshold value 38. Moreover, after returning to the third state St3, in which the reductant injection is stopped, the NOx output signal 23 of the first exhaust gas sensor 11 is registered at stabilised exhaust gas condition, and it is verified that the registered value is within a window defined by predefined lower and upper threshold values 36, 37.

The first diagnosing sequence Si is advantageously performed before the third diagnosing sequence S3, because this allows elimination of any erroneous NOx conversion test result due to erroneous exhaust gas sensor measurements. Consequently, in case the NOx conversion efficiency does not reach an expected level, the cause can be narrowed down to malfunctioning SCR catalyst, reductant injector failure, or bad reductant quality, or the like. The third diagnosing sequence S3 may preferably be performed before the second diagnosing sequence S2, because this order of testing, where the fuel injection is cut such that the engine will automatically stop at the end of the second diagnosing sequence S2) has the advantage of allowing a natural and efficient termination of the self-diagnosing method.

The result of the self-diagnosing method is preferably displayed to a technician and/or user by means of a display screen, or the like. Coloured indicators, for example red or green, may be provided for different SCR system components, such as NOx level and oxygen concentration level measurement performance of the exhaust gas sensors 11, 12, and/or SCR system functionality, such as NOx conversion performance. The output signals 22, 23 of the exhaust gas sensors 11, 12 may be registered at certain strategic time points, such as when the engine 2 operates in a high NOx output engine operating state and low NOx output engine operating state. Alternatively, the output signals of the exhaust gas sensors may be registered continuously. This has the advantage of allowing real time monitoring of the engine and SCR system condition, thereby providing the technician or user with improved understanding of the SCR system and functionality.

The term "high NOx output engine state" is herein considered as an engine state with relatively high engine speed, and with the engine configured to generate substantially the highest possible NOx emission level for a parked vehicle. The term "low NOx output engine state" is herein considered as an engine state with relatively low engine speed, and with the engine configured to generate substantially the lowest possible NOx emission level for a parked vehicle with engine still running. The expressions "upstream NOx level" and "downstream NOx level" used herein refer to the NOx level immediately upstream respectively downstream of the SCR catalyst, i.e. at the inlet respectively outlet of the SCR catalyst. Upstream and downstream may be used also in other expressions and having the corresponding meaning.

The self-diagnosing method according to the invention was described comprising three different diagnosing sequences S1, S2, S3. However, the self-diagnosing method may comprise only a first diagnosing sequence S1, or two diagnosing sequences S1, S2, S3, or all three disclosed diagnosing sequences S1, S2, S3. Moreover, the consecutive order of these diagnosing sequences S1, S2) S3 may be varied, according to the specific needs, and is not limited to the herein disclosed order. One or more diagnosing sequence S1, S2, S3 may also be repeated. Also, the disclosed states St1, St2, etc. are not to be considered binding for realising the method according to the invention, but merely an abstract model for describing the underlying inventive concept.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. A self-diagnosing method for diagnosing a selective catalytic reduction (SCR) system of a vehicle, the vehicle comprises an internal combustion engine, wherein the SCR system is arranged downstream of the engine, wherein the SCR system comprises at least one exhaust gas sensor being sensitive to nitrogen oxides (NOx) gas, and wherein the method comprises a first diagnosing sequence of:

ensuring that the vehicle is in a stationary state;

controlling the engine to operate in a high NOx output engine operating state and in a low NOx output engine operating state;
registering an output signal of the at least one exhaust gas sensor when the engine operates in each of the high NOx output engine operating state and low NOx output engine operating state; and
diagnosing NOx measurement performance of the at least one exhaust gas sensor by comparison of the registered sensor output in the high NOx output engine operating state and the low NOx output operating state.

2. The method of claim 1, wherein the first diagnosing sequence comprises controlling the engine to perform at least one transition from the high NOx output engine operating state to the low NOx output engine operating state, and from the low NOx output engine operating state to the high NOx output engine operating state, and registering the output signal from the at least one exhaust gas sensor before and after each of the transitions.

3. The method according to claim 1, wherein the SCR system comprises a SCR catalyst and a reductant injector, wherein the at least one exhaust gas sensor is arranged downstream the SCR catalyst, and wherein the method comprising a third diagnosing sequence of:
controlling the reductant injector to perform in a non-reductant injection state and in a reductant injection state;
registering an output signal from the at least one exhaust gas sensor when the reductant injector performs in each of the non-reductant injection state and the reductant injection state; and
diagnosing NOx conversion efficiency of the SCR catalyst on the basis of the registered sensor output.

4. The method according to claim 3, wherein the third diagnosing sequence comprises repeating at least one shift between the non-reductant injection state and the reductant injection state, and registering the output signal from the at least one exhaust gas sensor at least before and after each of the repeated shifts.

5. The method according to claim 3, wherein the first diagnosing sequence is performed before the third diagnosing sequence.

6. The method according to claim 1, wherein the at least one exhaust gas sensor being sensitive also to oxygen, such that the at least one exhaust gas sensor is capable of measuring the oxygen concentration of the exhaust gas for determining a lambda ($\lambda$) value of the air/fuel mixture entering the cylinders, wherein the method further comprising diagnosing oxygen measurement performance of the at least one exhaust gas sensor on the basis of the registered sensor output.

7. The method according to claim 1, wherein the SCR system comprises a SCR catalyst and at least two exhaust gas sensors, wherein a first exhaust gas sensor of the at least two exhaust gas sensors is arranged downstream of the SCR catalyst, and a second exhaust gas sensor of the at least two exhaust gas sensors is arranged upstream of the SCR catalyst, wherein both the first and second exhaust gas sensors being sensitive to NOx gas, wherein the first diagnosing sequence comprises the steps of:
registering an output signal of each of the first and second exhaust gas sensors when the engine performs in each of the high NOx output engine operating state and low NOx output engine operating state; and
diagnosing NOx measurement performance of the first and second exhaust gas sensors on the basis of the registered sensor output.

8. The method according to claim 1, further comprising controlling that an exhaust gas temperature of the SCR system exceeds a predetermined temperature level.

9. The method according to claim 1, wherein the SCR system comprises a SCR catalyst and a reductant injector, wherein the at least one exhaust gas sensor is arranged downstream the SCR catalyst, the method further comprising controlling that the reductant injection is stopped, and that a SCR catalyst ammonia storage level is substantially below a maximal ammonia storage capacity of the SCR catalyst.

10. The method according to claim 1, further comprising the step of registering an output from the at least one exhaust gas sensor after an exhaust gas temperature associated with the at least one exhaust gas sensor exceeds a predetermined temperature level.

11. A computer comprising a computer program for performing all the steps of claim 1 when the program is run on the computer.

12. A computer program product comprising program code stored on a non-transitory computer readable medium for performing all the steps of claim 1 when the program product is nm on a computer.

13. A self-diagnosing method for diagnosing a selective catalytic reduction (SCR) system of a vehicle, the vehicle comprises an internal combustion engine, wherein the SCR system is arranged downstream of the engine, wherein the SCR system comprises at least one exhaust gas sensor being sensitive to nitrogen oxides (NOx) gas, and wherein the method comprises a first diagnosing sequence of:
ensuring that the vehicle is in a stationary state;
controlling the engine to operate in a high NOx output engine operating state and in a low NOx output engine operating state;
registering an output signal of the at least one exhaust gas sensor when the engine operates in each of the high NOx output engine operating state and low NOx output engine operating state; and
diagnosing NOx measurement performance of the at least one exhaust gas sensor on the basis of the registered sensor output, and
comprising a second diagnosing sequence of:
increasing engine speed to a high level engine speed;
cutting fuel supply to the engine at the high level engine speed and registering the output signal from the at least one exhaust gas sensor at least a certain a time period after fuel supply cut; and
diagnosing NOx measurement performance of the at least one exhaust gas sensor on the basis of the registered sensor output.

14. The method according to claim 13, wherein the first diagnosing sequence is performed before the second diagnosing sequence.

15. The method according to claim 13, wherein the SCR system comprises a SCR catalyst and a reductant injector, wherein the at least one exhaust gas sensor is arranged downstream the SCR catalyst, and wherein the method comprising a third diagnosing sequence of:
controlling the reductant injector to perform in a non-reductant injection state and in a reductant injection state;
registering an output signal from the at least one exhaust gas sensor when the reductant injector performs in each of the non-reductant injection state and the reductant injection state;
diagnosing NOx conversion efficiency of the SCR catalyst on the basis of the registered sensor output; and the third diagnosing sequence is performed before the second diagnosing sequence.

16. A computer system for implementing a method for diagnosing a selective catalytic reduction (SCR) system of a vehicle, the vehicle comprises an internal combustion engine, wherein the SCR system is arranged downstream of the engine, wherein the SCR system comprises at least one exhaust gas sensor being sensitive to nitrogen oxides (NOx) gas, the computer system comprising a processor operable to:
  ensuring that the vehicle is in a stationary state;
  controlling the engine to operate in a high NOx output engine operating state and in a low NOx output engine operating state;
  registering an output signal of the at least one exhaust gas sensor when the engine operates in each of the high NOx output engine operating state and low NOx output engine operating state; and
  diagnosing NOx measurement performance of the at least one exhaust gas sensor by comparison of the registered sensor output in the high NOx output engine operating state and the low NOx output operating state.

\* \* \* \* \*